United States Patent [19]

Breda et al.

[11] Patent Number: 4,901,414
[45] Date of Patent: Feb. 20, 1990

[54] METHOD FOR ASSEMBLING PAIRS OF HEAT EXCHANGER PLATES

[75] Inventors: Michael A. Breda, East Amherst; George K. Snyder, Lockport, both of N.Y.

[73] Assignee: General Motors Corporation, Detroit, Mich.

[21] Appl. No.: 329,170

[22] Filed: Mar. 27, 1989

[51] Int. Cl.⁴ .............................................. B23P 15/26
[52] U.S. Cl. ................... 29/890.04; 29/890.039; 29/726; 165/167
[58] Field of Search ................ 29/157.3 R, 157.3 A, 29/157.3 AH, 157.3 B, 157.3 C, 157.3 D, 157.3 H, 157.4, 463, 726; 165/153, 167

[56] References Cited

U.S. PATENT DOCUMENTS

| | | | |
|---|---|---|---|
| 4,321,739 | 3/1982 | Martin et al. | 29/157.3 A |
| 4,377,024 | 3/1983 | Saperstein | 29/157.3 C |
| 4,470,455 | 9/1984 | Sacca | 165/167 |
| 4,486,933 | 12/1984 | Iwase et al. | 29/157.3 C X |
| 4,535,839 | 8/1985 | Sacca | 165/167 X |
| 4,592,414 | 6/1986 | Beasley | 165/167 X |

FOREIGN PATENT DOCUMENTS 41590 2/1987 Japan ................................... 165/167

Primary Examiner—Mark Rosenbaum
Assistant Examiner—Peter Vo
Attorney, Agent, or Firm—Ronald L. Phillips

[57] ABSTRACT

A method and apparatus for assembling heat exchanger elements includes a pallet comprising a frame and a plurality of blocks slidably aligned on each side of the frame with opposed pairs of blocks slotted to receive pairs of plates dropped into the pallet. Lead screws driven by servomotors and engaging the blocks position the blocks at the loading station and control the block spacing (determined at each station by the screw pitch) to allow plate insertion or to allow insertion of fin elements between the plates. To quickly move the pallet into the station auxiliary lead screws connected to the main screws engage the blocks of the pallet outside the loading station to assert positive controlled advancement force on the pallet.

4 Claims, 4 Drawing Sheets

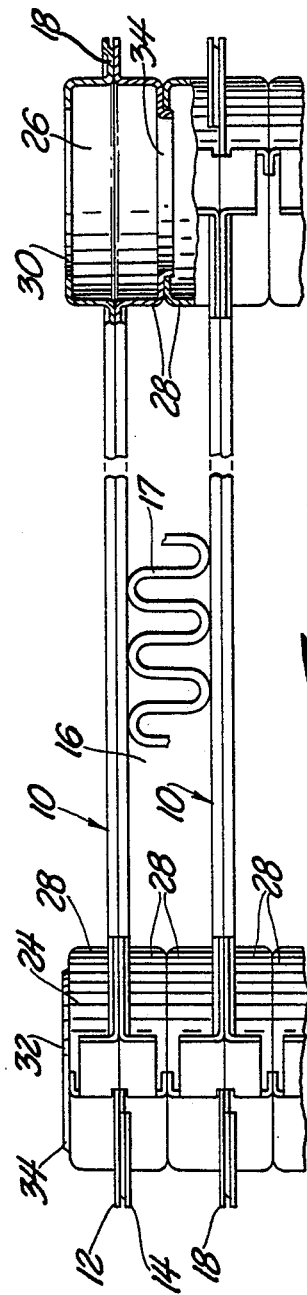
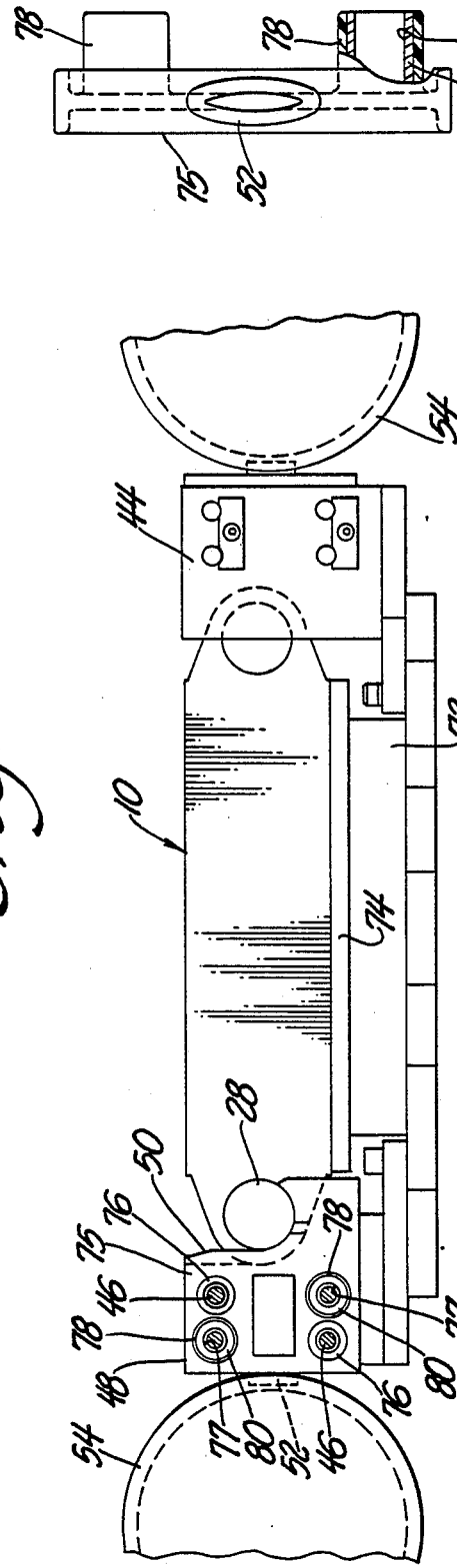

METHOD FOR ASSEMBLING PAIRS OF HEAT EXCHANGER PLATES

FIELD OF THE INVENTION

This invention relates to a method and apparatus for assembling heat exchanger elements and particularly to such a method and apparatus to automatically receive and couple such elements when inserted.

BACKGROUND OF THE INVENTION

Heat exchangers of the plate type are comprised of pairs of preformed plates joined to other pairs at their ends by integral bosses and separated at their middle section by air centers or corrugated fins, the plates and fins all being brazed together so that each pair of plates becomes a tube for carrying refrigerant, the bosses serving as a manifold for permitting refrigerant flow from one tube to another, and the fins facilitating heat exchange between the tubes and air flowing outside the tubes. U.S. Pat. No. 4,470,455 issued to Sacca describes such a plate type heat exchanger in detail.

The assembly of the plate type heat exchanger elements into a core ready for brazing has typically been carried out largely by hand operations. Specifically, the first step is to assemble a fin element between two plates and crimp the plates together into subassemblies where their bosses connect, and then manually stack such subassemblies along with side plates into a fixture which holds each subassembly in place.

It is desirable to enhance the assembly practice by an improved method and machine for assembly. In particular it has been found that the process is improved in terms of automation and in terms of reducing spacing in the fixture if it is begun by joining the plates together into pairs that eventually become tubes and inserting the plate pairs and side plates into a fixture and then inserting the centers between the plates. It is desirable to have a machine to perform the assembly operations to reduce the manufacturing expense and otherwise improve the efficiency of the assembly practice. It has been demonstrated that the machine assembly of plate pairs, air centers and side plates into a pallet is practical.

It is known to automatically assemble other styles of heat exchanger cores as shown in the U.S. Pat. No. 4,321,739 to Martin et al. In Martin et al the tubes are first inserted into blocks carried by chains and the centers are then loaded between the tubes which are well spaced by the blocks. The tubes and centers are gathered together as the blocks are removed from one tube at a time. Thus tubes and centers are arranged in alternate rows and headers are joined to the ends of the tubes and tanks are joined to the headers to couple the tubes together. The tubes do not directly coact and they have smooth exteriors which facilitate the insertion of centers, as contrasted with the plate and center type which requires that the plates each mate with their neighbors as well as to sandwich the air centers. Further, the plate edges protrude in a way to interfere with center insertion so that large spacings between the plates would be required to permit center insertion. The large spacings necessitate a large gathering distance and also allow centers to get out of position so that centers can interfere with the coupling of the plates during the gathering process.

SUMMARY OF THE INVENTION

It is therefore an object of the invention to provide a practical method and apparatus especially adapted to the automatic assembly of plates and centers into a heat exchanger core.

The invention is carried out in an apparatus for assembling pairs of plates and air centers for a heat exchanger core by a pallet system comprising; a frame movable in a longitudinal direction, a plurality of blocks in the frame supported along each side of the frame and mounted for limited movement in the frame in the longitudinal direction, each block having a slot for receiving an end of a pair of plates and positioned opposite a similar block for receiving an opposite end of the pair of plates, and means for selectively engaging the blocks for moving the blocks and the frame longitudinally, the engaging means being effective to position the blocks at a loading station and to vary the spacing of the blocks to facilitate insertion of elements into the frame.

The invention is further carried out in a process for assembling pairs of plates and air centers for a heat exchanger core in a pallet having plate holders by the method of inserting plates into holders comprising the steps of: positioning a holder at a loading station in a position spaced from adjacent holders so that adjacent parts do not interfere with plate insertion, dropping a pair of plates into the holder, then moving the holder toward an adjacent holder to mate one pair of the plates with a previously loaded pair of plates, and repeating the positioning, dropping and moving steps for the next adjacent holder until the holders are filled as desired.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an elevation partly in section of stacked plates for a heat exchanger core assembled by the method and apparatus of the invention, FIG. 5 is an end view of the pallet of FIG. 3 with a plate of FIG. 1 loaded into the pallet and with an end plate removed to show block detail, FIG. 6 is a partly broken away end view of the block of FIG. 5.

DESCRIPTION OF THE PREFERRED EMBODIMENT

Figure 2:
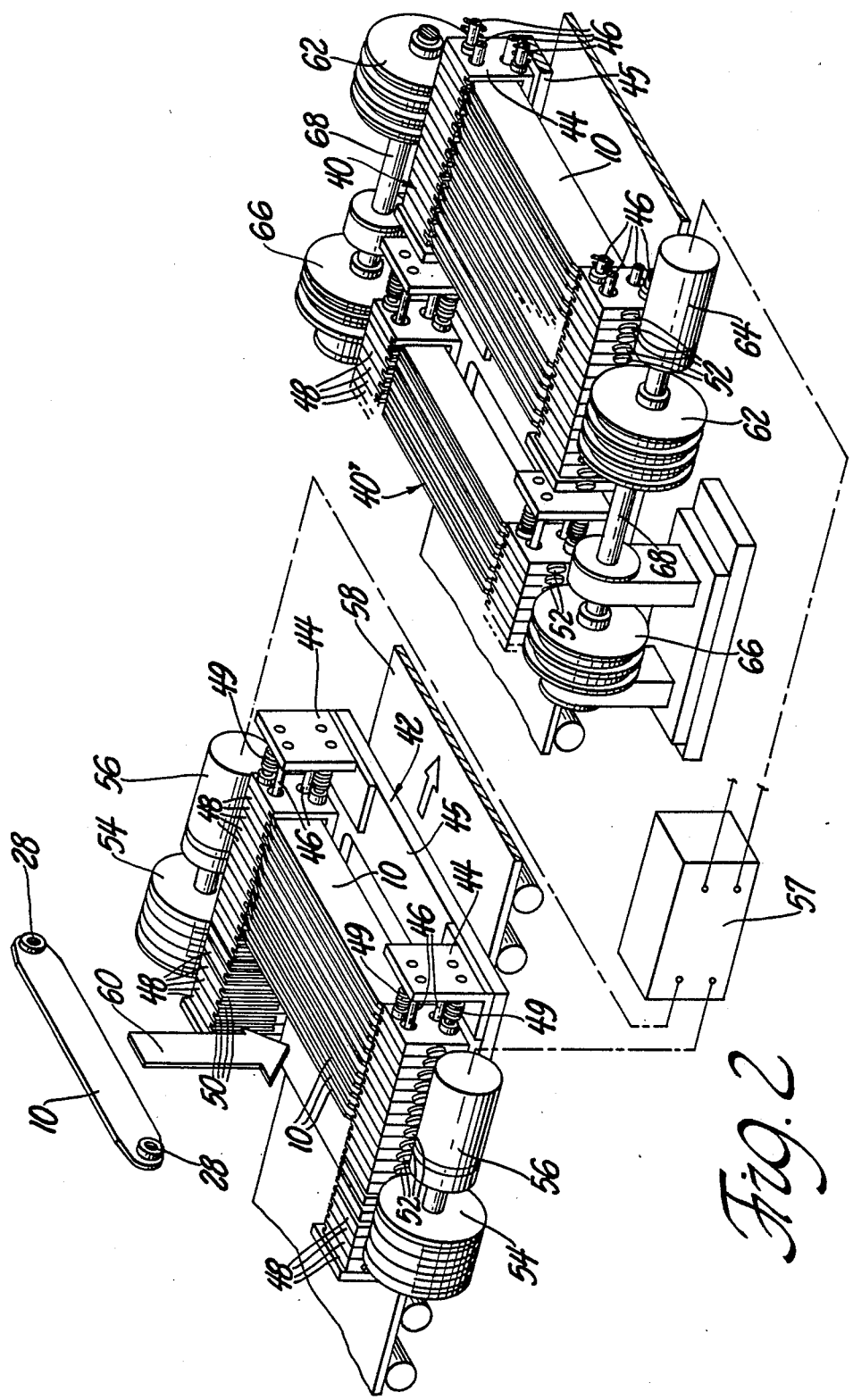
FIG. 2 is an isometric view of an indexed pallet system according to the invention.
Figure 3:
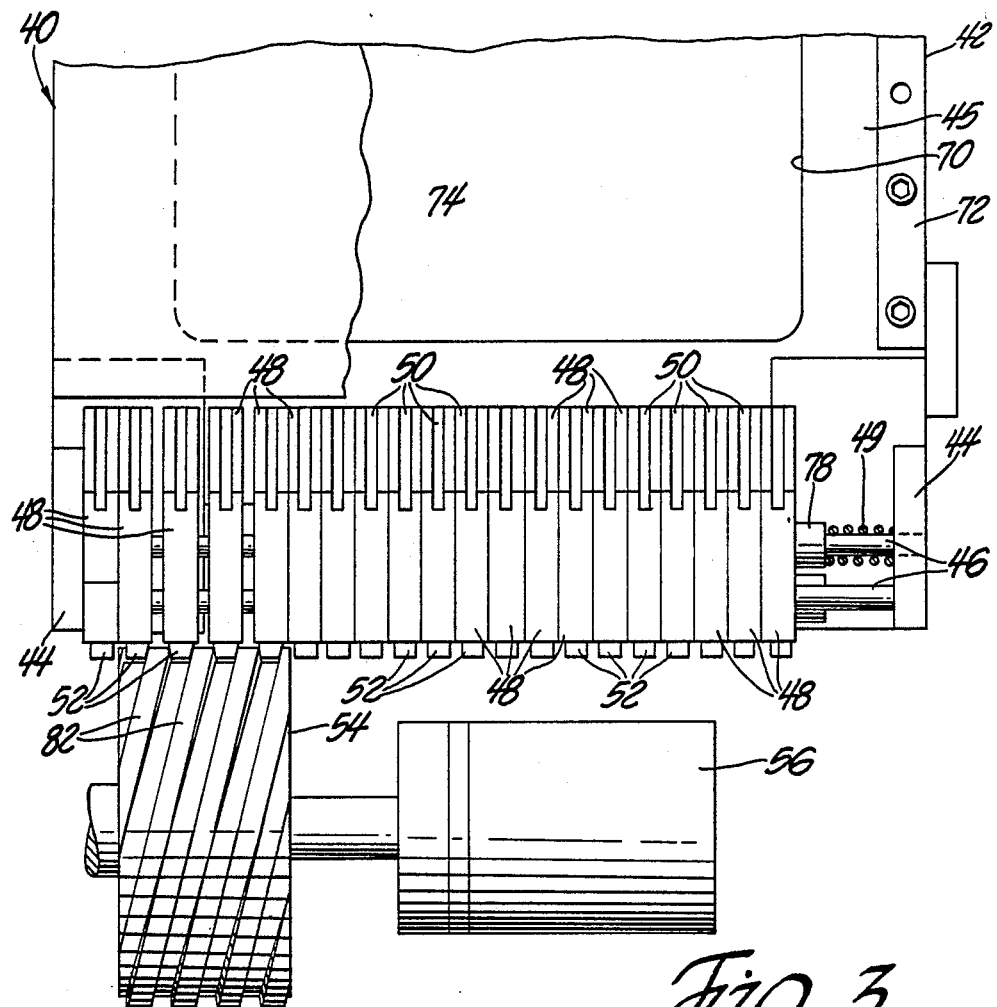
FIG. 3 is a plan view of the right half of a pallet and associated screw assembly of FIG. 2.
Figure 4:
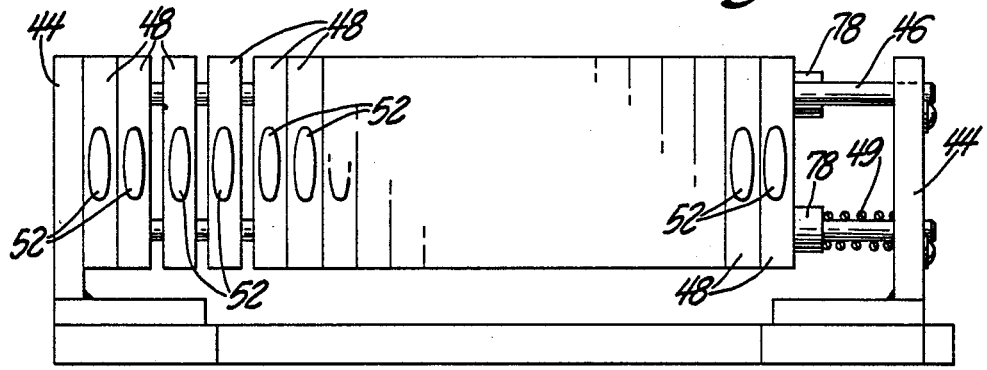
FIG. 4 is a side view of the pallet of FIG. 3.

A portion of the heat exchanger core to be assembled by the apparatus and method of the invention is shown in FIG. 1. Plate pairs 10 which will form tubes when brazed consist of plates 12 and 14 which when stacked form a heat exchanger core adapted to be used as an evaporator. The plate pairs 10 are stacked to define a space 16 therebetween for the flow of air. The space 16 includes a corrugated metal center or fin 17 with louvers struck out therefrom for increasing the heat exchange efficiency. Only a portion of the center 17 is illustrated.

For standard plate pairs 10 the individual plates 12 and 14 are configured identically, one of the plates is simply inverted and rotated 1800 relative to the other. Each plate has a flat peripheral edge portion 18 and the portions 18 of the two plates are formed so as to engage one another prior to braze jointure. Thus each pair of plates, when brazed, forms a tube for refrigerant. Inlet and outlet manifolds 24, 26 are formed by outwardly offset and generally circular portions 28 in each end of plates 12 and 14. An opening 30 is provided in the top surface at one end and an opening 32 is provided with an outwardly raised flange portion 34 at the other end. Thus, the plates are designed so that, when stacked, the flange portion 34 surrounding opening 32 fittingly engages the opening 30. This provides a registering relationship between the plates of two adjacent tubes.

In some cases the plates 12 and 14 are not configured identically in the sense that an opening 30 may be omitted to structure the manifold for fluid flow management through the core. The plate on either end of the core will be equipped with an inlet or outlet fitting at the opening 30 or 32. Thus the core is made up primarily of "standard" plate pairs combined with a few "special" plate pairs. In any event they all couple together in the same manner. The plate and heat exchanger structures are more fully described in the U.S. Pat. No. 4,470,455 to Sacca.

The general organization of the assembly machine is shown in FIG. 2. A pallet 40 comprises an open-sided frame 42 with vertical end plates 44 at each corner of a horizontal base plate 45. Four rods 46 supported by the end plates 44 extend longitudinally along each side to pass through and hold a plurality of perforated blocks 48 which can slide a limited amount along the rods. A coil spring 49 under compression surrounds alternate rods 46 on each side between an end plate 44 and the nearest block 48 to hold the blocks together against the other end of the frame unless the spring force is overcome. The blocks 48 each have a slot 50 for receiving the edges of a plate pair 10 adjacent an offset portion 28. Each block also has an outboard cam follower 52 extending to the side of the pallet. A lead screw 54 with its axis parallel to the rods 46 at each side of the path of the pallet engages just a few of the cam followers 52 at a given time. The lead screws 54 are synchronously rotated by servomotors 56 to advance the corresponding blocks 48 longitudinally so as to precisely position the blocks and to advance the entire pallet 40 as well. A microprocessor based controller 57 controls the servomotors. The lead screws are positioned at a loading station for plate pairs 10 and the pallets 40 are carried to the loading station by a power and free conveyor 58 which depends on a frictional contact to drive the pallet. The lead screws engage the cam followers of the blocks and positively and precisely position the blocks at a feed plane where plate pairs are dropped into the slots 50 in the blocks 48. As shown in FIG. 2 the first few blocks are holding plate pairs 10 and subsequent blocks are prepared to receive a plate pair being inserted as indicated by an arrow 60.

The width of the blocks is such that when they are nested together the adjacent plate pairs 10 are stacked together as shown in FIG. 1. A critical function of the pallet system is that the pitch of the lead screw 54 is greater than the width of the blocks so that the few blocks that are actively engaged by the lead screws are spaced far enough to permit insertion of the plate pairs 10 without interference by an adjacent plate pair and the adjacent pairs are moved into a nested assembly as they are released by the lead screws. The plate pairs 10 may not necessarily be loaded at the same station since it may be more convenient to have separate loading stations for each type of plate pair, standard or special. The conveyor 58 carries the pallet from one station to the next. At each station the blocks 48 are spaced apart as they pass the feeding plane and the proper plate pairs are inserted into empty slots according to a preset program. Centers 17 are also supplied to the pallet in the same manner. Center insertion occurs after all the plates are inserted since the plate pairs 10 position and laterally support the centers.

A center loading station is shown in FIG. 2 downstream from the plate loading station. Lead screws 62 driven by servomotors 64 are on opposite sides of the conveyor 58. The optimum spacing of the blocks for center insertion is less than for the plate pair insertion. Thus the lead screws 62 at the center loading station have a smaller pitch than those at the plate pair loading station. Accordingly, the pallet 40 can provide various insertion spacings under control of the lead screws at a various stations.

A special feature at the center loading station is an auxiliary lead screw 66 drivingly coupled to each lead screw 62 by a shaft 68 but spaced from the lead screw 62 by a distance of perhaps one half the length of a pallet 40. The purpose of the lead auxiliary screw 66 is to engage a pallet 40' which is waiting to enter the center loading station and positively advance the pallet at a rate determined by the motor 64 speed. In the absence of the lead screw 66 the pallet would be advanced by the power and free conveyor 58 which relies on friction to move the pallet and is accordingly limited in its ability to accelerate the pallet. The positive advancement is most advantageous when the waiting pallet is touching or nearly touching the pallet in the station. By positively advancing the waiting pallet 40' it can be accelerated quickly for positioning in the station under control of the lead screw 62, thus minimizing the time lapse between the last center insertion in one pallet 40 and the first center insertion in the next pallet. The benefit of minimizing the time lapse is to allow the supply of centers to proceed at a more uniform rate. In the most efficient arrangement the centers are fed to the pallet directly from the machine making the centers. That machine operates best at a constant output rate but it can vary its rate somewhat to accommodate the time lapse between pallets, providing that the time lapse is small. In other words, it is not desirable to stop the supply of centers each time a pallet is positioned in the loading station but some slow down is permissible. The positive advancement of the waiting pallet by the lead screw 66 in conjunction with the control by lead screw 62 permits its precise positioning in the loading station in the minimum time.

Details of the assembly machine are better shown in FIGS. 3, 4, 5 and 6 and include some elements not shown in FIG. 2. The base plate 45 has a large central aperture 70 and a short pedestal 72 at each end between the end plates 44. A platen 74 (FIG. 5) is supported on the pedestals with its upper surface flush with the bottom edges of the elements to be loaded into the pallet and is the support for centers when they are first loaded and are not yet held by the adjacent plates. The platen 74 also is used to lift the assembled core out of the pallet via an elevator, not shown, which pushes up through the large aperture 70 in the base plate.

The slot 50 in each block is configured to the shape of the plates 10 so that the plate pairs nest in the slot. The blocks also have relief to accommodate the offset portions 28 of the plates. Each block 48 has, in addition to the slot 50 and the cam follower 52, two flat side faces 75 which abut similar faces in adjacent blocks, two large holes 76 and two small holes 77 receiving the rods 46. The four holes are positioned at corners of a rectangle and two diagonal small holes 77 are surrounded by a boss 78 protruding beyond the faces 75 on one side of the block and containing a bushing 80 for sliding on the rods 46. The other set of diagonal holes 76 are large enough to receive the bosses 78 of the adjacent block. For the blocks to fit together with the adjoining faces 75 in contact two block types (for each side of the pallet) are used alternately so that each boss 78 of one block will align with and fit in the corresponding large hole 76 of the adjacent block. One type of block rides on two of the rails and the other type rides on the other two rails. The bosses protrude toward the end of the pallet 40 that contains some free space for block movement. The springs 49 on two of the rods reside in the space and extend between the end plates 44 and the bosses 78 of the end block to press the blocks together in the absence of the lead screws. When the lead screws engage some of the blocks the springs 49 are compressed due to the separation of those blocks. The frame 42 is moved by the lead screws 54 via forces acting through the blocks and the springs 49 if the springs are in the leading edge of the pallet. The other end of the pallet may be positioned in the front in which case the force from the lead screws is delivered directly by the blocks to the frame 42.

The lead screws 54 comprise helical threads 82 having a pitch determined by the block thickness and the block separation appropriate for a particular loading station. The thickness of each thread is sufficient to span the distance between adjacent cam followers 52. This assures that each block will be positively positioned by the screw threads. The cam followers 52 are essentially elliptical to accommodate the pitch angle of the threads.

Figure 7:
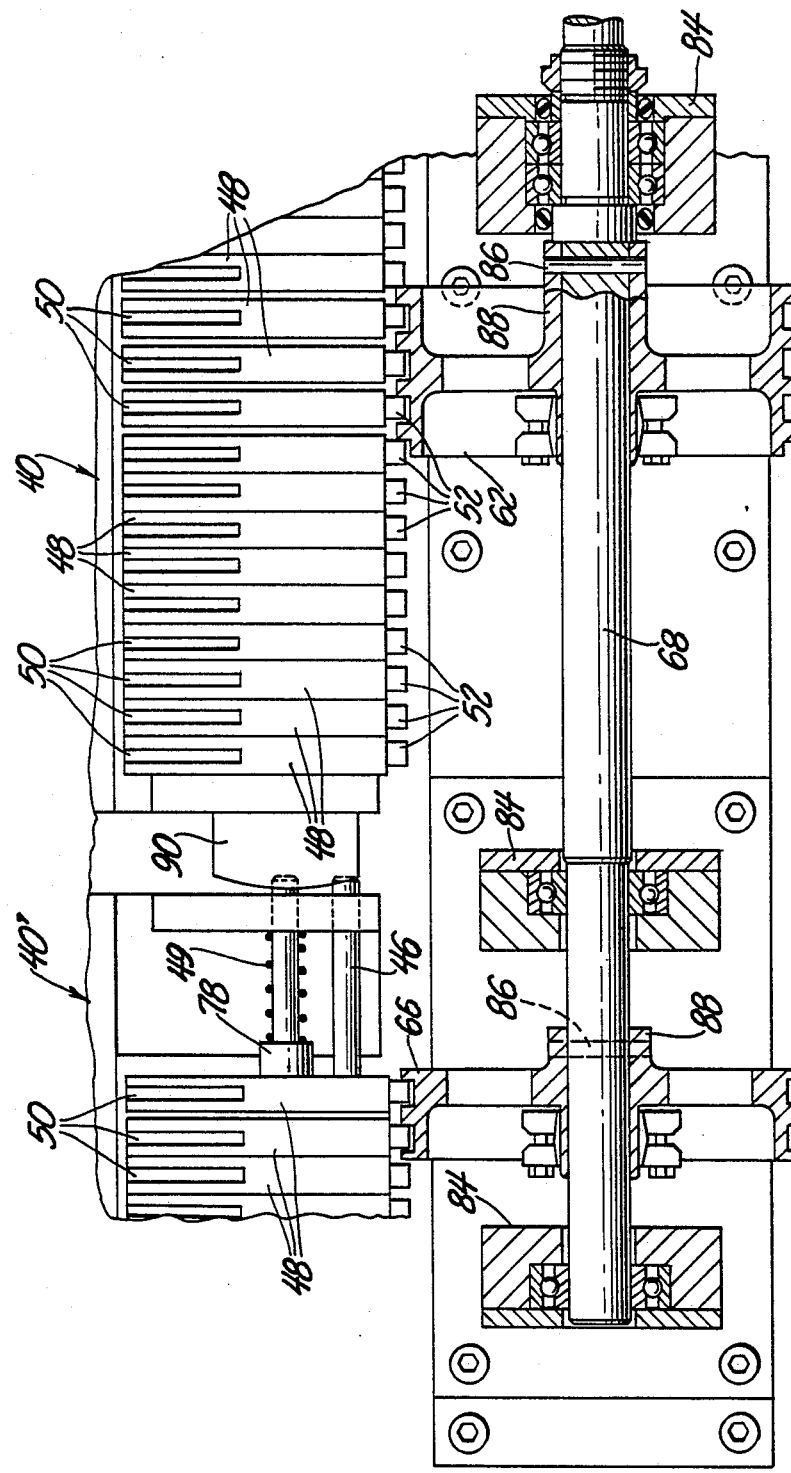
FIG. 7 is a partial plan view of the dual screw arrangement of FIG. 2 and associated pallets.

FIG. 7 shows the lead screw 62 connected to the auxiliary lead screw 66 and coupled respectively to a pallet 40 in the center loading station and a waiting pallet 40'. The screw driving shaft 66 is supported in three spaced bearing blocks 84 and is driven at one end by a motor (not shown). Each screw 62, 68 is mounted on the shaft 66 and keyed thereto by a pin 86 passing through a hub 88 on the screw and through the shaft. The screw 62 is the same as the screw 56 at the plate loading station except for a smaller lead and thread width to conform to the smaller block spacing required for the center insertion. The pallets 40, 40' are shown with one closely following the other. A bumper 90 is fixed to the trailing end of each pallet for desired spacing of the waiting pallet from the one being loaded. This allows the leading blocks of the waiting pallet to smoothly mesh with the screw 68. In operation, the waiting pallet 40' is brought into contact with the rear end of the pallet 40 by the conveyor 58 preferably before the pallet 40 enters the loading station. When the first blocks of the pallet 40' reach the screw 68 the blocks will be captured by the screw so that the pallets 40 and 40' will be advanced together by the screws 62 and 68. When the pallet 40 is fully loaded with centers the motors 64 will accelerate to quickly remove the pallet 40 and simultaneously move the waiting pallet 40' into the station with accurate positioning for the insertion of the next center dropped into the loading plane.

Accurate positioning of the blocks is assured by driving the blocks directly by the lead screws and by driving the lead screws by servomotors under computer control. The amount of rotation of the servomotors and thus the position of each block is precisely controlled by the computer program.

The embodiments of the invention in which an exclusive property or privilege is claimed are defined as follows:

1. In a process for assembling pairs of tube plates and air centers for a heat exchanger core on a pallet having an array of adjacent plate holders corresponding in number to the number of desired tube plate pairs, a method of inserting the plates into the holders comprising the steps of:
   normally holding the holders in side to side contact on the pallet;
   advancing the pallet with the holders past a loading station;
   sequentially spacing each of the holders from the holders adjacent thereto as the holders advance past the loading station, said spacing being determined to prevent interference between a pair of plates previously loaded in one holder and a pair of plates being inserted in an adjacent trailing holder, and
   sequentially dropping pairs of plates into the holders at the loading station while they are spaced at the noninterferring distance from adjacent holders.

2. A method as defined in claim 1 wherein selected ones of the holders are loaded at the one loading station and other plate pairs of different configuration are loaded at a second loading station comprising the further steps of:
   sequentially spacing each of the holders from the holders adjacent thereto as the holders advance past the second loading station, said spacing being determined to prevent interference that would otherwise occur between a pair of plates previously loaded in one holder and a pair of plates being inserted in an adjacent trailing holder,
   determining if the holder at the second loading station is empty, then dropping a pair of plates into the empty holder at the second loading station while the empty holder is spaced at the noninterferring distance from adjacent holders.

3. In a process for assembling pairs of tube plates and air centers for a heat exchanger core on a pallet having an array of adjacent plate holders corresponding in number to the number of desired tube plate pairs, a method of inserting the plates and centers into the holders comprising the steps of:
   normally holding the holders in side to side contact on the pallet;
   advancing the pallet with the holders past a loading station;
   sequentially spacing each of the holders from the holders adjacent thereto as the holders advance past the plate loading station, said spacing being determined to prevent interference between a pair of plates previously loaded in one holder and a pair of plates being inserted in an adjacent trailing holder, and
   sequentially dropping pairs of plates into the holders at the loading station while they are spaced at the noninterferring distance from adjacent holders, sequentially spacing each plate loaded holder from adjacent plate loaded holders to separate adjacent loaded pairs of plates by a space sufficient to facilitate inserting the centers, sequentially inserting centers in an uncompressed state each between pairs of the loaded plates while they are separated by said space, and sequentially closing the spaces after each center insertion to compressively sandwich and thereby hold the centers between the pairs of loaded plates.

4. A process as defined in claim 3 wherein there is the further step of lifting the plates and centers free of the holders with a removable floor platen.

* * * * *